April 8, 1969 G. RAGSDALE 3,437,965
HEAT EXCHANGE APPARATUS FOR COOLING ELECTROMAGNETIC DEVICES
Filed Dec. 27, 1963
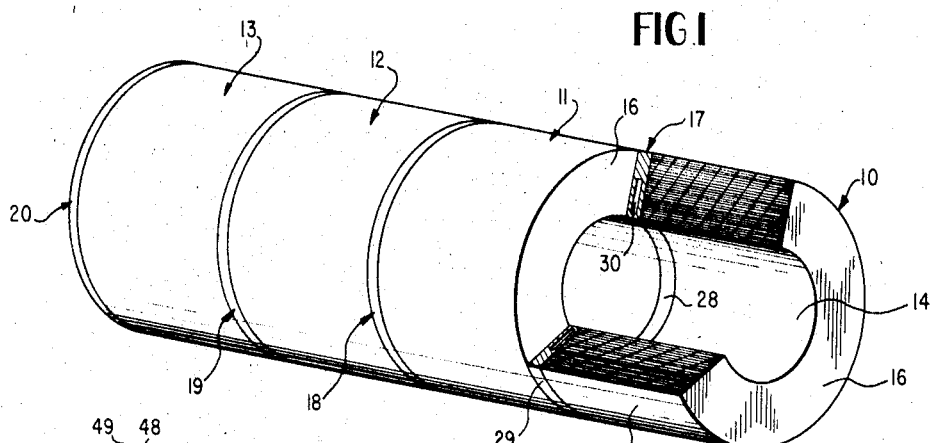
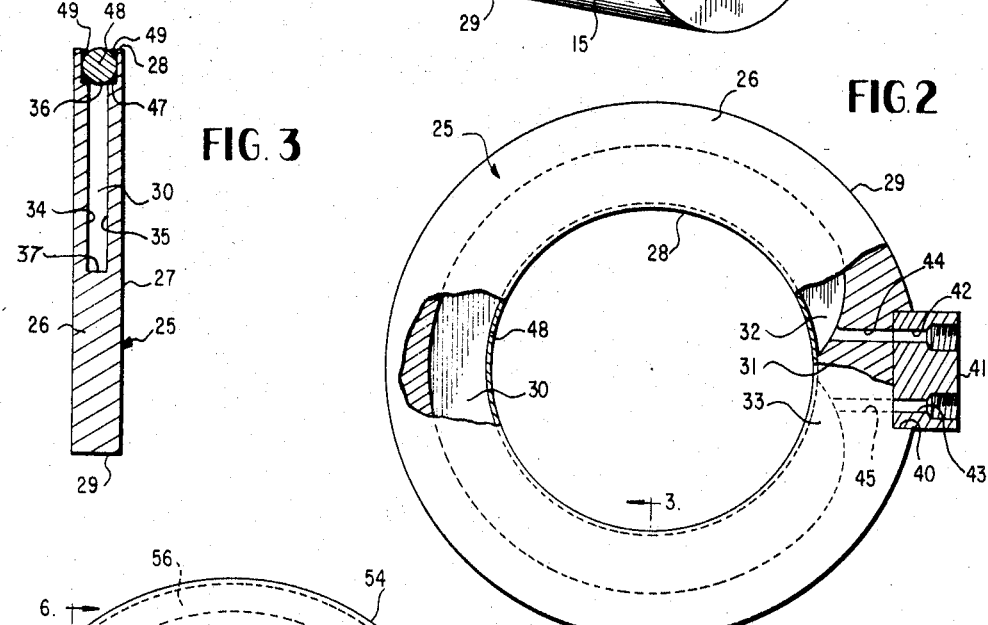
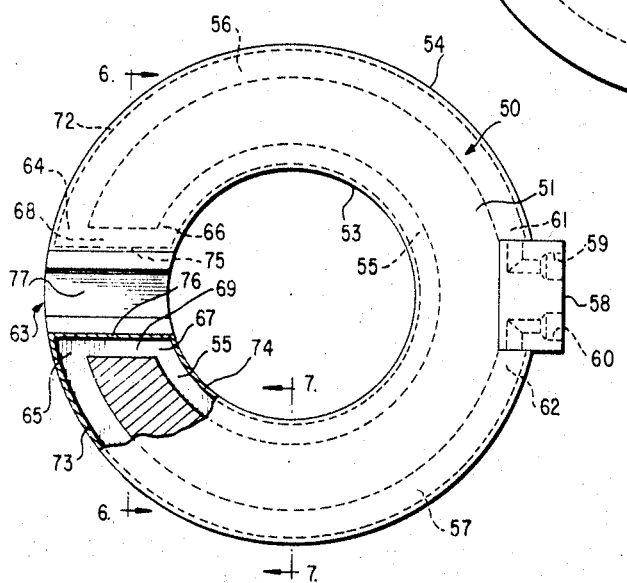
INVENTOR.
GEORGE RAGSDALE
BY Shanley + O'Neil
ATTORNEYS April 8, 1969     G. RAGSDALE     3,437,965
HEAT EXCHANGE APPARATUS FOR COOLING ELECTROMAGNETIC DEVICES
Filed Dec. 27, 1963
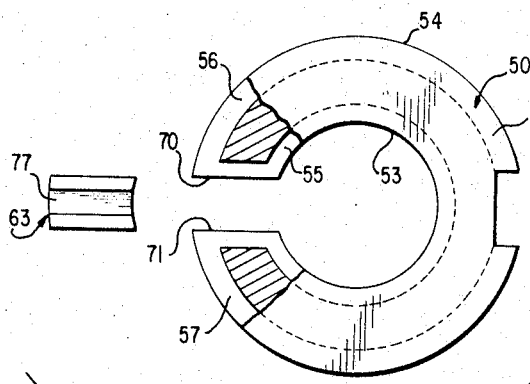
FIG. 5
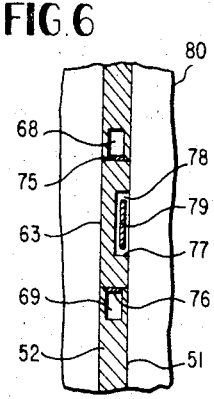
FIG. 6
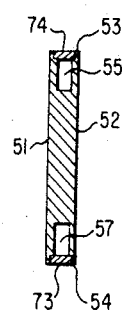
FIG. 7
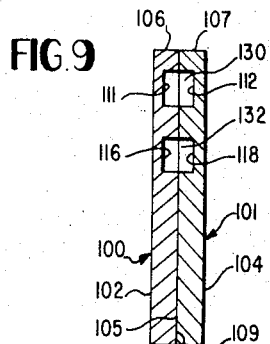
FIG. 9
FIG. 10
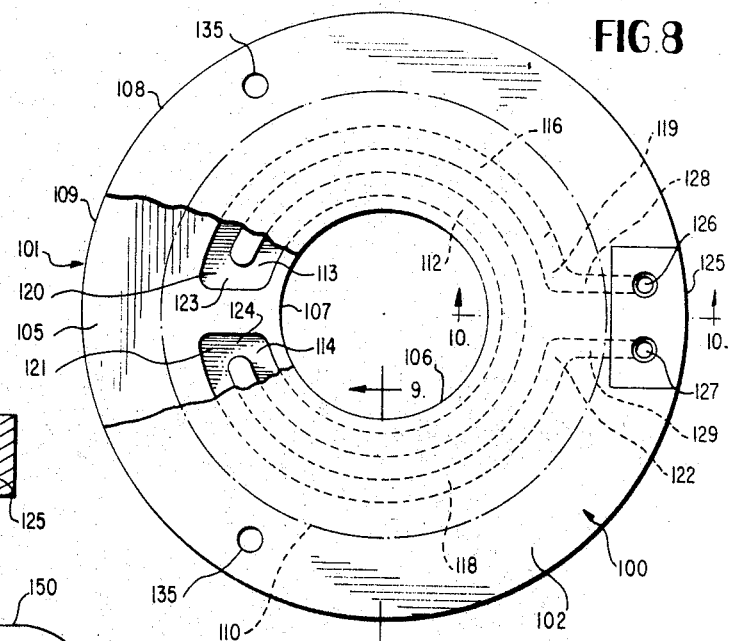
FIG. 8
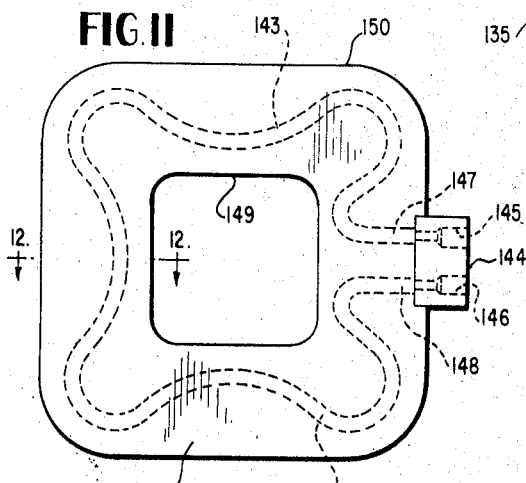
FIG. 11
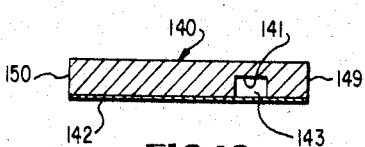
FIG. 12
INVENTOR
GEORGE RAGSDALE
BY *Shanley & O'Neil*
ATTORNEYS April 8, 1969 G. RAGSDALE 3,437,965
HEAT EXCHANGE APPARATUS FOR COOLING ELECTROMAGNETIC DEVICES
Filed Dec. 27, 1963 Sheet 3 of 3

INVENTOR
GEORGE RAGSDALE

BY *Shanley & O'Neil*

ATTORNEYS

United States Patent Office 3,437,965
Patented Apr. 8, 1969

3,437,965
HEAT EXCHANGE APPARATUS FOR COOLING
ELECTROMAGNETIC DEVICES
George Ragsdale, Ogallala, Nebr., assignor to Ogallala
Electronics Mfg., Inc., a corporation of Nebraska
Filed Dec. 27, 1963, Ser. No. 333,935
Int. Cl. H01f 27/08; H02b 1/00; H01b 7/34
U.S. Cl. 336—61                              6 Claims This invention relates to heat exchange apparatus and more particularly to fluid type heat exchange apparatus for cooling or shielding equipment.

The efficiency of fluid type heat exchange apparatus whether used to cool equipment by the removal of generated heat or as a heat shield to impede the flow of external heat to equipment depends upon a number of factors including the efficiency of heat transfer to the coolant fluid and of the removal of heat by the flow of the coolant fluid from the apparatus. Also, it is desirable that the heat exchange apparatus be of the smallest possible physical size especially in installations where the presence of heat exchange apparatus could adversely affect operation of the equipment such as the cooling of electromagnetic devices particularly of the type employing foil type coils used to produce high intensity magnetic fields from traveling wave and klystron tubes, for plasma engineering and for the control of nuclear reactions. Such electromagnetic devices may include a plurality of coils positioned in end-to-end relationship with a heat exchange apparatus interposed between adjacent coils. The physical dimension of the heat exchange apparatus measured along the axis of the coils should be as small as possible so as to minimize any adverse effect on the produced field due to the spacing between adjacent coils.

It is an object of the present invention to provide a novel heat exchange apparatus of the type employing a fluid coolant characterized by a high order of heat interchange efficiency.

Another object is to provide a novel heat exchange device employing a coolant fluid which is of small physical size yet presenting low resistance to the flow of coolant fluid therethrough.

Another object is to provide a heat exchange apparatus of the foregoing type which provides direct contact between the coolant fluid and the heat source.

Another object is to provide a heat exchange apparatus having the foregoing characteristics in the form of a relatively thin plate particularly adapted for the cooling or shielding of electromagnetic coils.

Still another object of the present invention is to provide a novel electromagnetic device including coils of the foil type which is capable of producing high intensity fields without overheating of the device.

Still another object is to provide a novel arrangement for cooling electromagnetic coils of the foil type which makes it possible to operate the coils at an optimum energy level.

A still further object of the present invention is to provide an electromagnetic coil of the foil type provided with an arrangement for blocking the flow of heat to or removing heat from the coil by the flow of a coolant fluid in heat interchange with the coil which presents a relatively low pressure drop to the flow of the coolant fluid and which is characterized by relatively high heat exchange efficiency between the coolant fluid and the coil.

A still further object is to provide a novel heat exchange apparatus particularly adapted for use with a plurality of coils of the foil type.

Other objects and features of the present invention will appear more fully from the following detailed description considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

In the drawings, in which similar reference characters denote similar elements through the several views:

FIGURE 1 is a three-dimensional view, partly in section, of an electromagnetic device constructed in accordance with one embodiment of the present invention;

FIGURE 2 is a view in plan, partly in section, of a portion of the device shown in FIGURE 1;

FIGURE 3 is a view in section taken along the line 3—3 of FIGURE 2;

FIGURE 4 is a plan view, partly in section, of another embodiment of the present invention;

FIGURE 5 is an exploded view of the embodiment shown in FIGURE 4;

FIGURE 6 is a view in section taken along the line 6—6 of FIGURE 4;

FIGURE 7 is a view in section taken along the line 7—7 of FIGURE 4;

FIGURE 8 is a plan view, partly in section, of another embodiment of the present invention;

FIGURE 9 is a view in section taken along the line 9—9 of FIGURE 8;

FIGURE 10 is a view in section taken along the line 10—10 of FIGURE 8;

FIGURE 11 is a view in plan of another embodiment of the present invention;

FIGURE 12 is a view in section taken along the line 12—12 of FIGURE 11;

Figure 13:
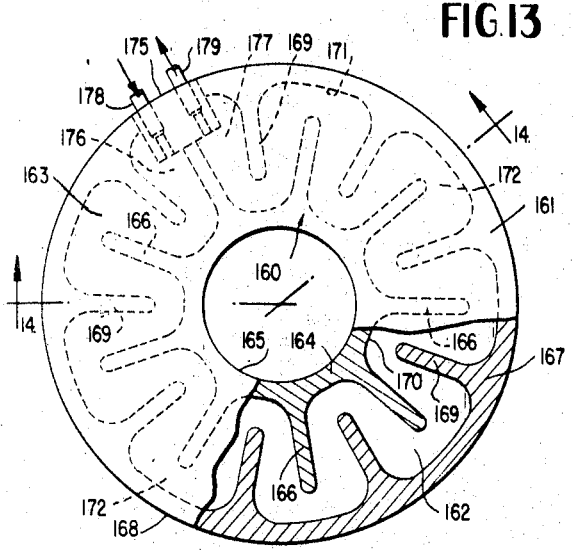
FIGURE 13 is a plan view, with a portion broken away, of another embodiment of the invention.

With reference more particularly to FIGURE 1 of the drawings, an electromagnetic device embodying the principles of the present invention is shown therein including a plurality of foil type coils 10, 11, 12, and 13 positioned in end-to-end relationship with their longitudinal axes coincident. The foil coils are of toroidal shape having an inner surface 14 and an outer surface 15 joined by parallel end surfaces 16. A cooling device is interposed between adjacent ends of pairs of coils; cooling device 17 being interposed between adjacent end surfaces of the coils 10 and 11, cooling device 18 being interposed between adjacent end surfaces of coils 11 and 12, and cooling device 19 being interposed between adjacent end surfaces of coil sections 12 and 13. A cooling device 20 is positioned on the free end surface of the coil 13 and it is to be understood that a cooling device may be positioned adjacent the other end of the coil 10 and that the device may include any desired number of coils. The cooling devices are shown to be of substantially the same cross-sectional shape as the coils with which they are associated but in some installations the cooling devices may protrude outwardly beyond thte outer or inner surfaces of the coils. In addition, it is to be understood that the dimensions of the coils and cooling devices shown in FIGURE 1 are not necessarily representative of actual practice and in most cases the cooling devices will be of substantially less width and be of substantially greater outside diameter. For example, with coils of toroidal shape having an outside diameter of two feet and an inside diameter of one foot, the cooling device would be of similar cross-sectional shape and possess a width dimension of the order of one-quarter inch or less and may be of the order of one-eighth inch for cooling devices of smaller inside and outside diameters.

As shown more clearly in FIGURES 2 and 3, the cooling device 17 comprises a relatively thin flat plate 25 formed of material having high heat conductivity, such as copper, and being of toroidal shape corresponding to the shape of the coils 10 and 11. The toroidal plate 25 includes end surfaces 26 and 27, an internal cylindrical surface 28 corresponding substantially to the internal cylindrical surfaces 14 of the coils 10 and 11, and an external cylindrical surface 29 corresponding substantially to the external cylindrical surfaces 15 of the coils. The plate 25 includes means forming an internal coolant fluid passageway 30 extending about the central longitudinal axis of the plate from opposite sides of a solid portion 31 of tthe plate; the passageway 30 having an inlet region 32 on one side of the solid portion 31 and an outlet region 33 on the other side of the solid portion. The side walls 34 and 25 of the passageway 30 are spaced inwardly from the end surfaces 26 and 27 of the plate 25, respectively, while the inner circumferential wall 36 of the passageway is located close to the inner cylindrical surface 28 and the outer circumferential wall 37 of the passageway is projected radially outwardly from the inner surface 28 a substantial distance toward the outer surface 29. The plate 25 is provided with a rectangular notch 40 for receiving a block 41 secured to the plate 25 by hard silver solder, for example. The block 41 includes a threaded inlet bore 42 and a threaded outlet bore 43 and bores 44 and 45 are formed in the plate 25 to establish fluid communication between the inlet region 32 and the inlet bore 42 and between the outlet region 33 and the outlet bore 43, respectively. A source of coolant fluid, such as water, for example, is connected to the inlet bore 42 by means of a conduit, not shown, and the coolant fluid flows through the bore 44 into the inlet region 32 and then flows through the passageway 30 in a counter-clockwise direction, as viewed in the drawing, and into the outlet region 33 from which the fluid flows through the bore 45 and the outlet bore 43. The fluid from the outlet bore 43 may be discharged from the system or may be circulated in a closed cycle through heat removing means and then returned to the inlet bore 42.

The passageway 30 is formed in the relatively thin plate 25 by cutting a groove, such as by a milling operation, in the inner cylindrical surface 28 parallel to the surfaces 26 and 27 and in a direction toward the outer surface 29 of a depth in excess of one-half the radial distance between the surfaces 28 and 29 as may be necessary to meet the particular cooling requirements; the groove being cut throughout the circumference of the surface 28 except in the solid portion 31. The circumferential opening to the groove in the inner cylindrical surface 28 is closed by any suitable means such as by cutting a wider groove immediately adjacent the surface 28 to provide shoulders 47 for receiving a closure member 48 extending throughout the circumferential length of the groove between opposite sides of the solid material 31. The closure 48 may be secured to the plate 25 by any suitable means such as hard silver solder 49, for example.

The embodiment of the invention shown in FIGURES 4, 5, 6, and 7 of the drawings comprises a flat plate 50 of toroidal shape having flat exterior surfaces 51 and 52 perpendicular to its longitudinal axis, an inner cylindrical edge surface 53, and an outer cylindrical edge surface 54. The plate 50 includes an inner passageway 55 adjacent the inner circumferential edge surface 53 and outer passageways 56 and 57 adjacent the external cylindrical edge surface 54; the passageways being arranged so that coolant fluid flows through one of the outer passageways, then inwardly for flow through the inner passageway from which the coolant fluid is directed outwardly for flow through the other outer passageway. The plate 50 is provided with a notch at one side, namely the right-hand side as viewed in the drawings, to receive a block 58 provided with a threaded inlet bore 59 and a threaded outlet bore 60; the inlet bore 59 communicating with the inlet region 61 of the passageway 56 and the outlet bore 60 communicating with the exit region 62 of the passageway 57. At a point displaced from the block 58, the plate 50 includes a solid portion 63 which extends from the inner cylindrical edge surface 53 to the outer cylindrical edge surface 54. The passageway 56 extends from its inlet region 61 adjacent the outer surface 54 and terminates in a region 64 adjacent a side wall of the block 63 while the passageway 57 extends from its outlet region 62 to an inlet region 65 adjacent the opposite side wall of the block 63. The inner passageway 55 extends throughout the circumference of the inner cylindrical wall 53 except for the block 63 and the latter passageway includes an inlet region 66 located adjacent one side wall of the block 63 and an exit region 67 located adjacent the opposite side of the block. A passageway 68 is provided in the plate 50 communicating with the exit region 64 of the passageway 56 and the inlet region 66 of the passageway 55 and a passageway 69 is provided in the plate 50 communicating with the inlet region 65 of the passageway 57 and the exit region 67 of the passageway 55 to provide the circulation described above.

In the construction of the embodiment of the invention shown in FIGURES 4, 5, 6, and 7, the plate is cut to remove the block 63 and thus present edge surfaces 70 and 71, as shown in FIGURE 5, which are spaced from each other and may be parallel if desired. The inner passageway 55 is formed by cutting a groove inwardly from the inner cylindrical surface 53 throughout its circumference between the surfaces 70 and 71 and the outer passageways 56 and 57 are formed by cutting grooves inwardly from the external surface 54, the grooves extending throughout the circumference of the outer surface 54 between the block 58 and the surfaces 70 and 71. Grooves are cut inwardly from the surfaces 70 and 71 to provide the passageways 68 and 69. The outer passageways 56 and 57, the inner passageway 55, as well as the passageways 68 and 69, are closed in a manner similar to the arrangement shown in FIGURE 4; closure members 72 and 73 being provided for the outer passageways 56 and 57, respectively, closure member 74 being provided for the inner passageway 55, and closure members 75 and 76 being provided for the passageways 68 and 69, respectively. The block 63 is then returned in its original position, shown in FIGURE 5, and if desired may be attached to the plate 50 such as by hard silver solder, for example. As shown more clearly in FIGURE 6, a notch 77 may be cut in the block 63 from one of its outermost surfaces to provide a space 78 for receiving an electrical conduit 79 leading from the inside surface of a coil 80 the end of which is located adjacent one surface of the plate 50.

The cooling device according to the embodiment shown in FIGURES 8, 9 and 10 of the drawings includes a pair of plates 100 and 101 including parallel side surfaces 102, 103 and 104, 105, inner cylindrical edge surfaces 106 and 107 and outer cylindrical edge surfaces 108 and 109, respectively. In this embodiment, as well as in the other embodiments, the outer cylindrical edge surfaces 108 and 109 may, as shown, be of a diameter greater than the outer diameter 110 of the coils with which the device is used. The surfaces 103 and 105 each includes an inner groove 111 and 112, respectively, which originate at inlet region 113 and follow respective inner cylindrical edges 106 and 107 substantially throughout their circumferences and terminate at outlet region 114. The surfaces 103 and 105 also each include outer grooves 115–116 and 117–118, respectively, located outwardly from the inner grooves 111 and 112. The grooves 115 and 117 originate at an inlet region 119 and terminate at an outlet region 120 adjacent the inlet region 113, and the grooves 116 and 118 originate at an inlet region 121, adjacent the outlet region 114, and terminate in an outlet region 122 adjacent to but isolated from the inlet region 119. The surfaces 103 and 105 are also provided with grooves connecting the inlet and outlet regions 113 and 120 and the outlet and inlet regions 114 and 121; such grooves on the surface 105 being designated by reference characters 123 and 124, respectively. The plates 100 and 101 are correspondingly notched to receive a block 125 provided with an inlet bore 126 and an outlet bore 127, and the surfaces 103 and 105 are grooved to provide passageways 128 and 129 forming fluid communication between the inlet bore 126 and the inlet region 119 and between the outlet region 122 and the outlet bore 127.

The grooves 111 and 112, 115 and 117, and 116 and 118 in the surfaces 103 and 105 are complementary so that when the plates 100 and 101 are positioned with their surfaces 103 and 105 in contact, as shown in FIGURE 9, the grooves 111 and 112 form an inside passageway 130, the grooves 115 and 117 form an outside passageway 131, and the grooves 116 and 118 form an outside passageway 132. The plates 100 and 101 may be joined together in any suitable manner, such as by hard silver solder, for example, and the portion of the plates which extends outwardly beyond the outermost diameter of the coils may be provided with openings for use in joining the plates together, for use in assembling the coils or for use in lifting the assembled device.

In the embodiment of FIGURES 11 and 12, the cooling device comprises a main plate 140 having a groove 141 cut in one of its side surfaces and a thin cover 142 overlying the grooved surface of the plate 140 and secured thereto to close the groove and provide a coolant passageway 143. The plate 140 receives a block 144 having an inlet bore 145 and an outlet bore 146 respectively communicating with the inlet region 147 and the outlet region 148 of the passageway. The passageway 143 is shown following a somewhat sinuous path as it proceeds around the plate from the inlet to the outlet alternately projecting toward the inner and outer surface edges 149 and 150, respectively, of the plate.

Figure 14:
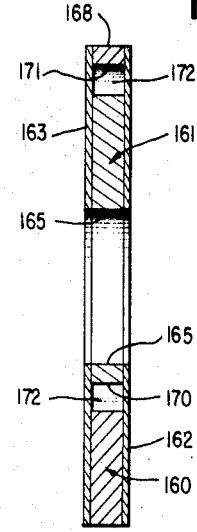
FIGURE 14 is a view in section taken along the line 14—14 of FIGURE 13.

The cooling device shown in FIGURES 13 and 14 comprises an inner member 160 and an outer member 161 joined together by relatively thin cover plates 162 and 163 secured to both sides of the members 160 and 161. The inner member 160 includes a hub portion 164 presenting a continuous inner edge surface 165 and including a plurality of elongated portions 166 projecting outwardly therefrom at spaced angular positions while the outer member 161 includes a rim portion 167 presenting a continuous outer edge surface 168 and including a plurality of elongated portions 169 projecting inwardly therefrom also at spaced angular positions. The members 160 and 161 are relatively positioned with elongated portions 166 extending between adjacent pairs of elongated portions 169 and with the latter elongated portions extending between adjacent pairs of elongated portions 166 in substantially equal angularly spaced relationship and the elongated portions 166 and 169 are of a radial length so as to terminate in spaced relation with the rim portion 167 and the hub portion 164, respectively, by a distance substantially equal to the angular spacing between adjacent elongated portions 166 and 169. The cover members 162 and 163, which are relatively thin as compared to the width of the members 160 and 161, are secured to opposite side surfaces of the latter members to secure the members 160 and 161 in the foregoing relative relationship, as shown in FIGURE 13, so that the elongated portions 166 and the inner surfaces 170 of the hub portion therebetween, the elongated portions 169 and the inner surfaces 171 of the rim portion therebetween and the cover plates 162 and 163 define a passageway 172 of sinuous form extending about the central axis of the device. The inlet and outlet of the passageway 172 may be formed by a block 175 inserted in the rim portion in sealing contact with one of the elongated portions 166 so that the inlet region 176 and the outlet region 177 of the passageway 172 are located on opposite sides of the latter elongated portion. The block 175 may include an inlet coolant fluid conduit 178 communicating with the inlet region 176 and an outlet coolant fluid conduit 179 communicating with the outlet region 177. The cover plates 162 and 163 overlie both sides of the members 160 and 161 from the inner surface 165 outwardly to the outer surface 168 and may include an opening of a shape corresponding to the surface 165 and an outer surface corresponding to the surface 168.

Figure 15:
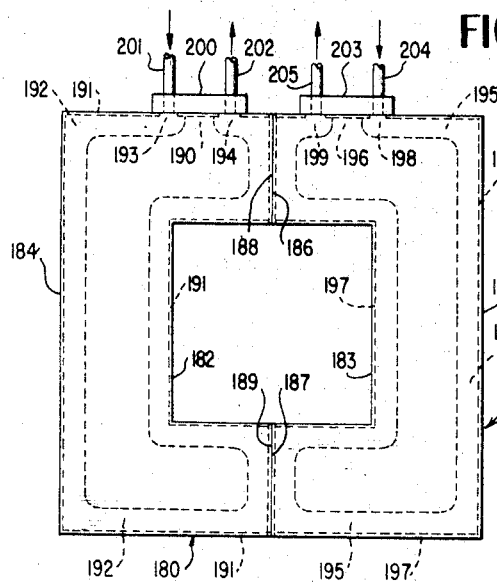
FIGURE 15 is a view in plan of another embodiment of the invention.

The embodiment of the invention shown in FIGURE 15 comprises a cooling device made up of a plurality of plate sections 180 and 181 each respectively including corresponding generally C-shaped inner edge surfaces 182 and 183, generally C-shaped outer surfaces 184 and 185, and adjacent end surfaces 186, 187 and 188, 189. A groove is cut in the section 180 inwardly from its peripheral edge surfaces 186, 182, 187, 184 from both sides of a solid portion 190 and the opening in the groove is closed by a closure member 191 to define a passageway 192 having an inlet region 193 and an outlet region 194 on opposite sides of the solid portion 190. In a similar manner, a passageway 195 is formed adjacent the outer peripheral surfaces 188, 183, 189, and 185 of the section 181 and extending from opposite sides of solid portion 196; the passageway being defined in part by closure member 197 and having inlet region 198 and outlet region 199 on opposite sides of solid portion 196. A metallic strap 200 may be secured to the outer edge surface 184 in the region of the solid portion 190 to provide coolant fluid inlet and outlet connections for the passageway 192; the strap including an inlet conduit 201 communicating with the inlet region 193 and an outlet conduit 202 communicating with the outlet region 194. A similar strap 203, provided with an inlet conduit 204 and outlet conduit 205 may be secured to the outer edge 185 of section 181 to provide means for introducing coolant fluid and withdrawing coolant fluid from the passageway 195. If desired, a pair of the conduits 201, 202, 204, and 205 may be joined together and the remaining pair used as coolant fluid inlet and outlet conduits to provide series circulation through the passageways 192 and 193. It is to be understood that any number of plate sections may be employed and that the concept of providing a cooling device made up of a plurality of plate sections may be practiced by utilizing any of the coolant passageway defining means described and disclosed above.

Figure 16:
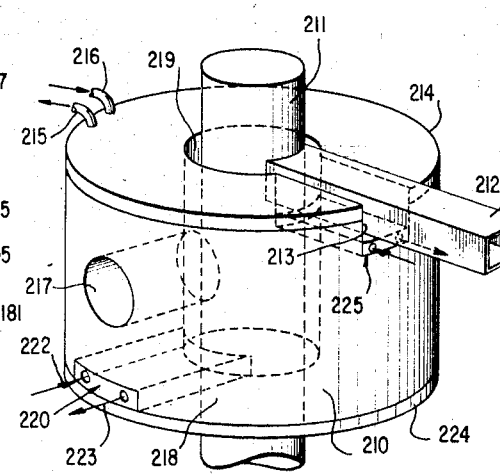
FIGURE 16 is a three-dimensional view, partly in section, of a device incorporating another embodiment of the invention.
Figure 17:
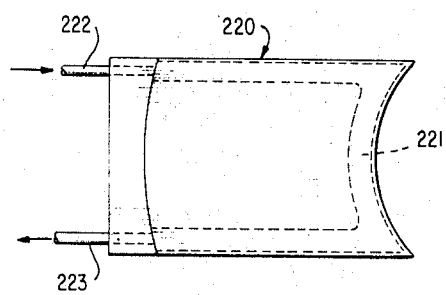
FIGURE 17 is a view in plan of a part of the device shown in FIGURE 16.

In FIGURES 16 and 17, another embodiment of the invention is shown in combination with a foil coil 210 for an electronic tube 211 having a waveguide output 212. The coil 210 surrounds the tube 211 and is slotted at 213 to provide an opening for the waveguide. The arrangement includes a cooling plate 214 adjacent the end surface of the coil into which the slot 213 is cut and the cooling plate extends about and overlies the end surface from one side of the slot to the other. The cooling plate 214 may be constructed in accordance with any of the preceding embodiments and is provided with an inlet coolant fluid conduit 215 and an outlet coolant fluid conduit 216. The coil 210 includes an opening 217 extending through the coil from its outer surface 218 to its inner surface 219 through which a probe may extend for controlling operation of the tube 211. Removal of the conductive material of the coil by providing the opening 217 concentrates the flow of current and increases the temperature of the coil in the region of the opening. In order to compensate for such regional high temperature, the end surface of the coil in the region of the opening may be cut to provide a shallow groove extending from the outer surface 218 to the inner surface 219 for receiving a small cooling plate 220. As shown in FIGURE 17, the cooling plate includes a passageway 221 about its periphery communicating with fluid coolant inlet conduit 222 and coolant fluid outlet conduit 223. The outer surface of the cooling plate 220, that is the lower surface as viewed in the drawing, preferably lies in the plane of the end surface of the coil so as to permit a cooling device 224 to be placed adjacent such surface. A small cooling plate 225 also may be located in the notched surface of the coil 210 beneath the waveguide 212. The plate 225 may be constructed in a manner as shown in FIGURE 17.

All of the embodiments of the invention described above are characterized by the provision of a single element, or members which function as a single element, positioned in direct contact with the heat source while providing passageway means for coolant fluid. The single element is made of material of high heat conductivity and may be designed to overlie in heat interchange relationship the total area of the heat source, such as the end surface of a foil type coil, and one or more coolant fluid passageways may be formed in the single element in such a manner as to obtain the removal of heat from the single element with an extremely high order of efficiency. With this construction, there exists a direct flow of heat from the heat source to the material of high heat conductivity and directly from such material to the coolant fluid whereas, in prior heat exchange devices of the tubular type, the area of the heat exchange device in contact with the heat source is substantially less than the area of the heat source or the flow of heat to the tubes is through a path of a total area substantially less than the area of the heat source and the path ordinarily includes solder joints creating impediments to heat transfer. The construction according to the present invention includes the further advantage of reducing the heat exchange apparatus to the smallest possible physical size which increases the heat interchange efficiency and minimizes any adverse effect upon equipment with which the heat exchange apparatus is used. The heat exchange apparatus shown in FIGURES 8, 11 and 13 are of composite construction but function as single elements for the transferring of heat directly from the heat source to the coolant fluid. In the embodiments of FIGURES 11 and 13, the relatively thin cover plate or plates need only be securely joined in liquid-tight connections to the main body member about the inner and outer peripheral edge surfaces as the low resistance to the flow of coolant fluid through the passageway or passageways presents no problem of flow between contacting surfaces. Also, in the embodiment of FIGURE 8, the plate members 100 and 101 need only be joined in liquid-tight connections about their adjacent inner and outer peripheral surfaces. It will be appreciated with respect to each embodiment of the invention that all required liquid-tight joints are located externally of the heat exchange apparatus. This makes it possible to form high quality joints such as by the use of hard silver solder, for example, and to easily locate any failure that may occur.

As mentioned above, the heat exchange apparatus provided by the present invention may be used as a heat shield as well as a heat removal means. The apparatus may be shaped to overlie the portion of equipment to be shielded, such as the end surface of a coil, for example. Thus, the present invention encompasses the provision of a heat exchange apparatus adjacent one or both ends of a coil. When the heat exchange apparatus of the present invention is used as a heat shield or as a heat removal means for a foil type coil, a thin layer of nonconductive material of high heat conductivity, such as Mylar film a thickness of 0.002 inch, may be interposed between the end surface of the foil coil and the adjacent surface of the heat exchange apparatus or some other arrangement may be employed to preclude shorting of the foil windings of the coil through the heat exchange apparatus.

Although in all the embodiments of the invention the heat exchange apparatus is of toroidal shape for use with toroidal shaped coils, it is to be expressly understood that the present invention is not limited to heat exchange apparatus of toroidal shape but may be formed to correspond to any desired shape including the shape of the end surface of a coil having an internal surface and an external surface whether of toroidal or non-toroidal form. It is known that foil type coils may be wound to conform to any shape as required to produce a particular magnetic field and it is to be expressly understood that heat exchange apparatus embodying the principles of the present invention may be used in combination with coils of any shape. By way of example, in addition to toroidal shapes, foil coils may be formed to include inner and outer surfaces in the general form of a triangle, a rhombus, a trapezoid, a regular or irregular polygon, a sector, and a non-symmetrical ellipse. Thus, the term "substantial toroidal" as used herein and in the appended claims covers coils having internal and external surfaces of toroidal as well as nontoroidal shape. Furthermore, the term "substantial toroidal" encompasses heat exchange apparatus made up of a plurality of sections as shown in FIGURE 15 as well as heat exchange apparatus shown in FIGURES 4 and 16, which overlie a major but not the total area of a heat source of toroidal shape.

Although several embodiments of the invention have been disclosed and described herein, it is to be expressly understood that various changes and modifications may be made therein without departing from the spirit of the invention as well understood by those skilled in the art. For example, as noted above, the heat exchange apparatus may be of any desired shape including non-toroidal shapes; the specific arrangement of the passageways for the coolant fluid shown in certain embodiments may be employed in other embodiments, for example the arrangement of inner and outer coolant fluid passageways as shown in FIGURE 8 may be incorporated in the embodiment shown in FIGURE 11 while the coolant passageway shown in the latter figure may be employed in the embodiment of the former figure. Furthermore, the manner of connecting coolant fluid inlet and outlet conduits to the various embodiments is not limited to the specific arrangements illustrated in the drawings. For example, the block type of coolant inlet and outlet connections shown in FIGURES 2, 4, 8, and 11 may be replaced by conduits connected directly to internal bores communicating with the passageway or the strap arrangement shown in FIGURE 15 may be utilized. In addition, it is to be expressly understood that the concept of heat exchange apparatus including a plurality of sections is not limited to the use of two sections as shown in FIGURE 15 but may comprise more than two sections nor is it limited to the particular construction of the coolant fluid passageways shown in the latter figure as sections forming a heat exchange apparatus may be constructed in accordance with the embodiments of FIGURES 8, 11 and 13, for example. Furthermore, in a heat exchange apparatus made up of a plurality of sections, the sections may be fed with coolant fluid in parallel relation, or in series relation or a combination of series and parallel, if desired. Accordingly, reference will be had to the appended claims for a definition of the limits of the invention.

What is claimed is:

1. An electromagnetic device including a pair of foil type coils of substantial toroidal shape defined by an inner surface and an outer surface joined by parallel end surfaces, plate means having closely spaced parallel outside surfaces and being formed of material possessing high heat conductivity characteristics, the plate means having an internal edge wall corresponding substantially to the inner surface of the coils and an external edge wall located outwardly from the internal edge wall a distance at least equal to the distance between the inner and outer surfaces of the coils, the coils being positioned in end-to-end relation and the plate being interposed between adjacent end surfaces of the coils with the internal edge wall of the plate means in substantial alignment with the inner surface of the coils and with the outside surfaces of the plate means in contact with respective adjacent end surfaces of the coils, the plate means including first passageway defining means and second passageway defining means, the first passageway defining means defining a first passageway located adjacent the internal edge wall and projecting outwardly in a direction toward the external edge wall, the first passageway having an inlet end and an outlet end located adjacent each other and spaced from each other by material of the plate means and the first passageway extending about the internal edge wall adjacent the internal edge wall between the inlet end and the outlet end, the second passageway defining means defining a second passageway located adjacent the external edge wall and projecting inwardly in a direction toward the internal edge wall, the second passageway including a first portion having an inlet end and a second portion having an outlet end, the first portion extending along the external edge wall and terminating in an end located in the region of the inlet end of the first passageway, the second portion extending along the external edge wall and terminating in an end located in the region of the outlet end of the first passageway, means connecting the terminating end of the first portion and the inlet end of the first passageway, means connecting the terminating end of the second portion and the outlet end of the first passageway, and means for conducting coolant fluid into the inlet end of the first portion and for withdrawing coolant fluid from the outlet end of the second portion after flow through the first portion, the first passageway and the second portion.

2. An electromagnetic device including a foil type coil having an outer surface, an inner surface defining an opening and end surfaces joined to the inner and outer surfaces, a plate consisting of a single piece of material possessing high heat conductivity characteristics and having a pair of closely spaced opposing side surfaces and a pair of opposing edge surfaces including an internal edge surface and an external edge surface, the plate being positioned relative to the coil with one side surface of the plate adjacent one end surface of the coil, the internal edge surface of the plate corresponding substantially to the shape of the opening of the coil and the external edge surface of the plate at least corresponding to the outer surface of the coil, the groove forming a groove in said plate means having side and bottom walls defined by the material of the plate, the groove extending from the internal edge surface of the plate with the side walls of the groove extending between the pair of closely spaced opposed side surfaces of the plate and the bottom wall being spaced inwardly of the internal edge surface of the plate, cover means adjacent the internal edge surface of the plate closing the groove to define with the walls of the groove a fluid coolant passageway, the fluid coolant passageway extending about the internal edge surface of the plate at least in part adjacent the internal edge surface and having an inlet end and an outlet end spaced by material of the plate and located adjacent the internal edge surface of the plate, means forming a fluid inlet opening and a fluid outlet opening adjacent the external edge surface of the plate, and means forming a fluid passage in the plate between the fluid inlet opening and the inlet end of the fluid coolant passageway and a fluid passage in the plate between the fluid outlet opening and the outlet end of the fluid coolant passageway.

3. An electromagnetic device as defined in claim 2 including a second foil type coil positioned with one end surface of the second coil adjacent the other side surface of the plate.

4. An electromagnetic device as defined in claim 2 in which the groove extends between the pair of closely spaced side surfaces at least one-half the radial distance between the internal edge and external edge surfaces.

5. A heat exchange apparatus comprising a plate consisting of a single piece of material possessing high heat conductivity characteristics and having a pair of closely spaced opposing side surfaces and a pair of opposing edge surfaces including an internal end surface and an external edge surface, the groove forming a groove in said plate means having side and bottom walls defined by the material of the plate, the groove extending from the internal edge surface of the plate with the side walls of the groove extending between the pair of closely spaced opposed side surfaces of the plate and the bottom wall being spaced inwardly of the internal edge surface of the plate, cover means adjacent the internal edge surface of the plate closing the groove to define with the walls of the groove a fluid coolant passageway, the fluid coolant passageway extending about the internal edge surface of the plate at least in part adjacent the internal edge surface of the plate and having an inlet end and an outlet end spaced by material of the plate and located adjacent the internal edge surface of the plate, means forming a fluid inlet opening and a fluid outlet opening adjacent the external edge surface of the plate, and means forming a fluid passage in the plate between the fluid inlet opening and the inlet end of the fluid coolant passageway and a fluid passage in the plate between the fluid outlet opening and the outlet end of the fluid coolant passageway.

6. An electromagnetic device including a foil type coil having an outer surface, an inner surface defining an opening and end surfaces joined to the inner and outer surfaces, plate means formed of material possessing high heat conductivity characteristics and having a pair of closely spaced opposing side surfaces and a pair of opposing edge surfaces including an internal edge surface and an external edge surface, the plate means being positioned relative to the coil with one side surface of the plate means adjacent one end surface of the coil, the internal edge surface of the plate means corresponding substantially to the shape of the opening of the coil and the external edge surface of the plate means at least corresponding to the outer surface of the coil, means forming a groove in said plate means, the groove having side and bottom walls, the side walls of the groove being located between a first pair of opposed surfaces of the plate means and the bottom wall being spaced inwardly of one surface of a second pair of opposed surfaces of the plate means, cover means adjacent said one surface of the second pair of opposed surfaces closing the groove to define with the walls of the groove a fluid coolant passageway, the fluid coolant passageway extending about the internal edge surface of the plate means at least in part adjacent the internal edge surface and having an inlet end and an outlet end spaced by material of the plate means and located adjacent the internal edge surface of the plate means, means forming a fluid inlet opening and a fluid outlet opening adjacent the external edge surface of the plate means, means forming a fluid passage in the plate means between the fluid inlet opening and the inlet end of the fluid coolant passageway and a fluid passage in the plate means between the fluid outlet opening and the outlet end of the fluid coolant passageway, the plate means comprising inner and outer members positioned between relatively thin side members, one of said thin side members constituting said cover means, the inner member including angularly disposed portions projecting toward and terminating in spaced relation with the outer member, the outer member including angularly disposed portions projecting toward and terminating in spaced relation with the inner member, and the portions projecting toward one member being located between pairs of portions projecting toward the other member.

References Cited

UNITED STATES PATENTS

| | | | |
|---|---|---|---|
| 2,547,065 | 4/1951 | Wadhams | 336—61 |
| 2,571,872 | 10/1951 | Hayes | 174—15 |
| 2,854,608 | 9/1958 | McGuire et al. | 336—60 |

OTHER REFERENCES

German Application No. 1,074,915, Kling et al.

LARAMIE E. ASKIN, *Primary Examiner.*

THOMAS J. KOZMA, *Assistant Examiner.*

U.S. Cl. X.R.

317—100; 174—15; 165—47, 168